F. C. KUMMEROW.
CARPET BEATER.
APPLICATION FILED MAR. 3, 1913.
1,086,540.
Patented Feb. 10, 1914.
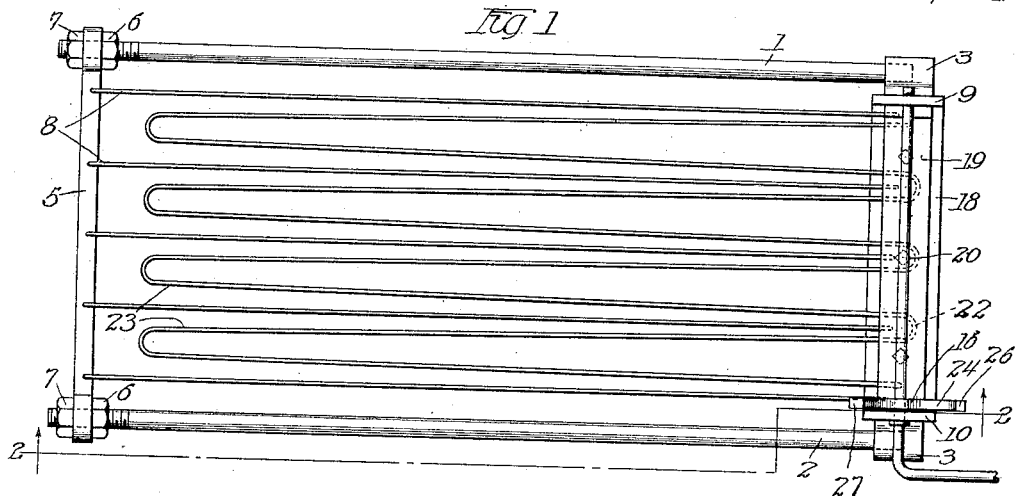
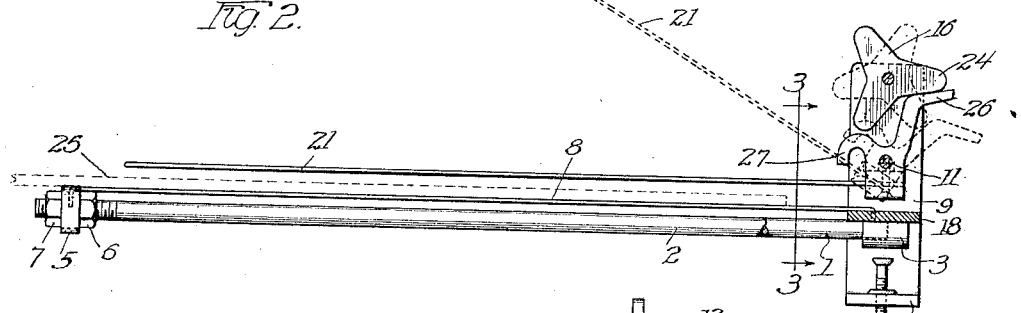
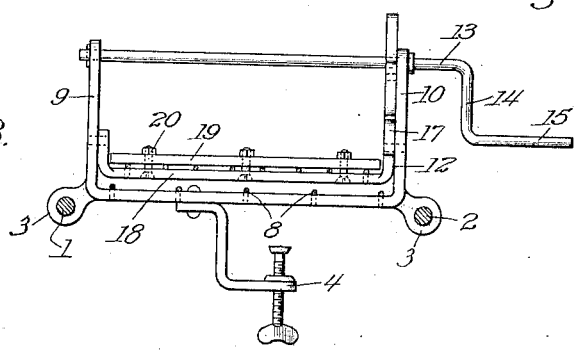
Witnesses:
Robert F. Weir
Arthur Carlson
Inventor
Ferdinand C. Kummerow
By Lotz & Scheible
Attys.

UNITED STATES PATENT OFFICE.

FERDINAND C. KUMMEROW, OF CHICAGO, ILLINOIS.

CARPET-BEATER.

1,086,540.    Specification of Letters Patent.    Patented Feb. 10, 1914.

Application filed March 3, 1913. Serial No. 751,869.

*To all whom it may concern:*

Be it known that I, FERDINAND C. KUMMEROW, citizen of the United States, residing at Chicago, in the county of Cook and State of Illinois, have invented certain new and useful Improvements in Carpet-Beaters; and I do hereby declare the following to be a full, clear, and exact description of the invention, such as will enable others skilled in the art to which it appertains to make and use the same.

My invention relates to mechanically actuated carpet beaters, one object of it being to provide a simple and readily portable beater having resilient supports upon which the carpet is adapted to rest and having means for adjusting these supports to alter their resiliency.

Another object is to provide a simple, effective and easily replaced beating member for an appliance of this kind.

A further object is to provide means whereby the beating members of the appliance will be slowly raised out of contact with the carpet, but rapidly returned into impact with the latter; and whereby the operating mechanism will coöperate with gravity to effect the rapid and violent impact of the beating members against the carpet.

Further objects will appear from the following specification and from the accompanying drawings, in which:

Figure —1— is a plan view of the carpet beater of my invention. Fig. —2— is a side elevation of the same, partly in section along the line 2—2 of Fig. —1—. Fig. —3— is a vertical section through Fig. —2— along the line 3—3.

In the embodiment shown in the drawings, the carpet beater of my invention consists of a rectangular frame having longitudinal side bars 1 and 2 rigidly secured to an end member 3 of the frame, which end member is adapted to be secured by a clamp 4 to a table or other suitable support for the beater. The side rods 1 and 2 pass through perforations in a bar 5 constituting the other end of the frame, this end bar 5 being secured to the bars 1 and 2 by nuts 6 and 7 threaded upon the said side rods and disposed at opposite sides of the end member 5. Interposed between the side rods 1 and 2 of the frame and preferably parallel to the same are a plurality of rods 8 made of steel or other resilient material and having their ends bent downward at right angles to the axis of the rods, the downwardly turned ends passing into corresponding perforations in the end members 3 and 5 of the frame respectively. By moving the nuts 6 and 7 upon the side bars 1 and 2 the resilient rods 8 may simultaneously be placed under any desired tension.

Mounted upon the end member 3 in proximity to the side rods 1 and 2 are upright portions 9 and 10 adapted to act as bearings for the shafts 11 of a rocking or oscillating member 12 and for a rotatable shaft 13, the said shafts being preferably disposed vertically over one another. The rotatable shaft 13 may have at one end a crank 14 terminating in a handle 15 by which the said shaft may be manually rotated; or it may be connected to power-driving mechanism if desired. Mounted upon the shaft 13 and rigidly secured thereto is a cam-wheel 16, the teeth of which cam-wheel are adapted to impinge against either arm of a bifurcated cam yoke 17 upon the oscillating member 12. The oscillating or rocking member 12 preferably has a pair of substantially horizontal and parallel portions 18 and 19, the said portions being adapted to be drawn toward each other by bolts 20. Interposed between the said clamping members 18 and 19 of the oscillating portion of my appliance are the looped ends 22 of a beating member 21 consisting preferably of a single steel rod bent into a plurality of zigzagged loops lying in substantially one and the same plane, the said beating member being somewhat shorter in length than the frame of my device. The longitudinal portions 23 of this beating member are so disposed with reference to the rest of my appliance as to move in vertical planes interposed between the successive resilient rods 8, which rods together with the frame of my device form a resilient grating against which the carpet to be beaten is adapted to bear. Consequently, the said beating members will impinge on the opposite side of the carpet from that bearing upon the rods of the grating at points intermediate of the meshes of the said grating; thereby tending to vibrate the material of the carpet so as to loosen the dust or other sediment residing between the fibers of the same.

In order to effectively shake out the said dust from between the meshes of the carpet or rug, I form the coacting cam-wheel 16 and cam yoke 17 of such configurations as to raise the beating loops slowly off the carpet, but to cause them to impinge rapidly and violently against the latter. For this purpose, I preferably use a three-toothed cam-wheel 16 in combination with a cam yoke 17 having two arms adapted to be engaged successively by the teeth of the said cam-wheel 16. When the cam-wheel is rotated in the direction shown by the arrow in Fig. —2— (the beating member 21 being then substantially at rest in contact with, or close to the carpet 25) the impinging tooth 24 of the rotating cam-wheel will first strike the longer fork 26 of the cam yoke 17 and will gradually move this into the position shown in dotted lines as 26', thereby raising the beating loops to the position also shown in dotted lines in Fig. —2—. As soon as the tooth 24 passes the position shown for it in dotted lines in Fig. —2—, the weight of the beating loops will tend to return the oscillating member to its original position, while the cam-actuating tooth of the cam-wheel will move out of the way of the arm 26, thereby permitting the beating member to drop by gravity toward the position in which it impinges against the carpet. By properly timing the speed of the rotating cam-wheel the tooth 24 will impinge against the shorter arm 27 of the cam yoke before the loops of the beating member strike against the carpet, and the pressure of the tooth upon the arm 27 of the cam yoke will accelerate the speed and momentum of the said beating loops. When thus moved by the combined action of gravity and of the power of the rotating shaft as transmitted through the cam to the oscillating member, the beating loops will attain a considerable momentum before the forward edge of the next tooth impinges against the top of the longer arm 26 of the cam yoke. Consequently, the flexibility of the beating loops will permit the momentum of these loops to carry them farther toward the carpet than the position occupied by the loops when the beater is at rest, thereby downwardly flexing the portions of the carpet intermediate of the bars of the grating against which the same bears. Then the rebound of the resilient loops after their impinging against the carpet will aid the action of the next succeeding tooth of the cam-wheel upon the cam yoke in raising the beating loops clear of the carpet, while the rebound of the carpet itself will tend to shake out the dust which has been loosened by the rapid and forcible impact of the beating loops against the carpet.

While I have shown and described the device of my invention as fitted with beating loops bent from a single continuous rod of steel and as having an operating shaft equipped with a cam-wheel having three teeth, I do not wish to be limited to these or other details of the embodiment disclosed herein, as the same might be modified in many ways without departing from the spirit of my invention.

I claim as my invention:

1. In a carpet beater, a resilient grating against which the carpet is adapted to bear; a plurality of beating members adapted to impinge against the opposite side of the carpet intermediate of the bars of the said grating; an oscillating member carrying the said beating members; and actuating means for causing the said oscillating member alternately to move the beating members out of engagement with the carpet, and into forcible contact therewith, the said actuating means including a bifurcated cam yoke upon the oscillating member and a rotating cam wheel adapted to engage the said cam yoke.

2. In a carpet beater, a resilient grating against which the carpet is adapted to bear; a plurality of beating members adapted to contact with the opposite side of the carpet intermediate of the bars of the said grating; an oscillating member carrying the said beating members; a bifurcated cam yoke upon the oscillating member, one arm thereof longer than the other; and a rotatable cam-wheel successively engaging the arms of the said bifurcated cam yoke.

In testimony whereof I have signed my name in presence of two subscribing witnesses.

FERDINAND C. KUMMEROW.

Witnesses:
ALBERT SCHEIBLE,
M. M. BOYLE.